United States Patent
Baxter et al.

(10) Patent No.: US 11,898,877 B2
(45) Date of Patent: Feb. 13, 2024

(54) LEVEL WITH VIAL PROTECTION ASSEMBLY

(71) Applicant: APEX BRANDS, INC., Apex, NC (US)

(72) Inventors: Adam Baxter, Raleigh, NC (US); Sujith Sunny, Kerala (IN); Bryan Washburn, Charlotte, NC (US)

(73) Assignee: Apex Brands, Inc., Apex, NC (US)

( * ) Notice: Subject to any disclaimer, the term of this patent is extended or adjusted under 35 U.S.C. 154(b) by 247 days.

(21) Appl. No.: 17/228,012

(22) Filed: Apr. 12, 2021

(65) Prior Publication Data

US 2022/0082382 A1    Mar. 17, 2022

Related U.S. Application Data

(63) Continuation-in-part of application No. 29/750,168, filed on Sep. 11, 2020, now Pat. No. Des. 959,304.

(51) Int. Cl.
*G01C 9/34* (2006.01)
*G01C 9/28* (2006.01)

(52) U.S. Cl.
CPC ............... *G01C 9/34* (2013.01); *G01C 9/28* (2013.01)

(58) Field of Classification Search
CPC .................................... G01C 9/34; G01C 9/28
See application file for complete search history.

(56) References Cited

U.S. PATENT DOCUMENTS

| 168,941 A | * | 10/1875 | Treadway | G01C 9/28 33/373 |
| 2,755,561 A | * | 7/1956 | Lafosse | G01C 9/28 33/379 |
| 4,295,279 A | * | 10/1981 | Sienknecht | B25H 1/0085 227/156 |

(Continued)

FOREIGN PATENT DOCUMENTS

JP    2000298002 A    10/2000

OTHER PUBLICATIONS

CN-113302449-A: Millane et al., "Two-reference Bottle Mounting System And Method", Aug. 2021 (Year: 2021).*

*Primary Examiner* — John Fitzgerald
*Assistant Examiner* — Tania Courson
(74) *Attorney, Agent, or Firm* — Burr & Forman LLP

(57) ABSTRACT

A level device may include a housing, a vial, a retention well and a multidirectional vial protection assembly. The housing may have a top face, a bottom face, a front face, a rear face, a first end and a second end. The vial may include a generally cylindrical tube with a bulge formed at a middle portion thereof. The vial may contain a liquid therein and an air bubble formed in the liquid such that the air bubble sits in the bulge when the vial is oriented such that one of the bottom face, front face, rear face, first end or second end is level or plumb. The retention well may be formed in the top face and extend through portions of the front and the rear faces toward the bottom face. The vial may be retained at opposing axial ends thereof in the retention well and may (Continued)

include an axis that extends substantially perpendicular to respective planes of the first end and the second end. The multidirectional vial protection assembly may be configured to extend over the top face proximate to the opposing axial ends of the vial to protect the vial in at least three directions.

20 Claims, 5 Drawing Sheets

(56) References Cited

U.S. PATENT DOCUMENTS

| | | | |
|---|---|---|---|
| 4,580,350 A * | 4/1986 | Fincher | G01C 9/28 33/372 |
| 4,663,856 A * | 5/1987 | Hall | G01C 9/28 D10/69 |
| D368,666 S * | 4/1996 | Fonte | D10/69 |
| D397,948 S * | 9/1998 | Bowen | D10/69 |
| D407,335 S * | 3/1999 | Bowen | D10/69 |
| D499,032 S * | 11/2004 | Khubani | D10/69 |
| 7,263,784 B1 | 9/2007 | Lee | |
| D553,519 S * | 10/2007 | Crumley | D10/69 |
| D626,020 S * | 10/2010 | Sabaschkow | D10/69 |
| 7,832,112 B2 * | 11/2010 | Christianson | G01C 9/28 33/379 |
| 8,701,305 B1 * | 4/2014 | Schoenebeck | G01C 9/28 33/613 |
| 9,267,778 B2 | 2/2016 | Burch et al. | |
| 9,829,277 B2 * | 11/2017 | Ratliff | F41G 3/06 |
| 10,260,874 B2 * | 4/2019 | De Cino | G01C 9/34 |
| 10,337,832 B1 * | 7/2019 | Ratliff | F41G 1/44 |
| D906,467 S * | 12/2020 | McCoy, II | G01C 9/28 D22/109 |
| 10,928,197 B2 * | 2/2021 | Wojciechowski | G01C 9/28 |
| 11,092,437 B1 * | 8/2021 | McCoy, II | F41G 1/54 |
| 11,193,764 B2 * | 12/2021 | Millane | G01C 9/28 |
| D959,304 S * | 8/2022 | Baxter | D10/69 |
| 2007/0056182 A1 | 3/2007 | Di Bitonto et al. | |
| 2010/0325910 A1 | 12/2010 | Huang | |
| 2011/0099823 A1 * | 5/2011 | Christianson | G01C 9/28 33/379 |
| 2017/0131098 A1 * | 5/2017 | Yu | G01C 9/34 |
| 2020/0232793 A1 * | 7/2020 | Millane | G01C 9/28 |
| 2022/0074741 A1 * | 3/2022 | Millane | G01C 9/34 |

* cited by examiner

LEVEL WITH VIAL PROTECTION ASSEMBLY

CROSS REFERENCE TO RELATED APPLICATIONS

This application is a continuation-in-part of U.S. patent application Ser. No. 29/750,167 filed on Sep. 11, 2020, the entire contents of which are hereby incorporated by reference in their entirety.

TECHNICAL FIELD

Example embodiments generally relate to leveling devices, and particularly relate to a spirit or bubble level that includes a structure for protecting the vial.

BACKGROUND

Measuring devices such as bubble levels (or spirit levels) have been around for a very long time, and are common measuring tools used in numerous contexts to obtain angular measurements or to ensure that surfaces are level or plumb. Most commonly, the bubble level is provided in a substantially cylindrical vial, and the vial is retained in a housing or body having at least one flat surface. The flat surface is positioned against a surface being measured so that when the bubble is in the center of the vial, the surface being measured (on which the flat surface of the body or housing is laid) is known to be level.

The attachment between the vial and the housing or body is typically a fixed attachment that leaves the level exposed so that it is easy to ready by a user. However, this mounting can leave the vial also exposed to damage or destruction if, for example, the device is dropped. Unfortunately, even placing other objects in a tool box or bag without care can result in damage or destruction of the vial as well.

Accordingly, it may be desirable to improve device designs in order to provide a more robust and convenient solution for enabling levels to be used with less likelihood of damage.

BRIEF SUMMARY OF SOME EXAMPLES

Some example embodiments may enable the provision of a level device. The level device may include a housing, a vial, a retention well and a multidirectional vial protection assembly. The housing may have a top face, a bottom face, a front face, a rear face, a first end and a second end. The vial may include a generally cylindrical tube with a bulge formed at a middle portion thereof. The vial may contain a liquid therein and an air bubble formed in the liquid such that the air bubble sits in the bulge when the vial is oriented such that one of the bottom face, front face, rear face, first end or second end is level or plumb. The retention well may be formed in the top face and extend through portions of the front and the rear faces toward the bottom face. The vial may be retained at opposing axial ends thereof in the retention well and may include an axis that extends substantially perpendicular to respective planes of the first end and the second end. The multidirectional vial protection assembly may be configured to extend over the top face proximate to the opposing axial ends of the vial to protect the vial in at least three directions.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
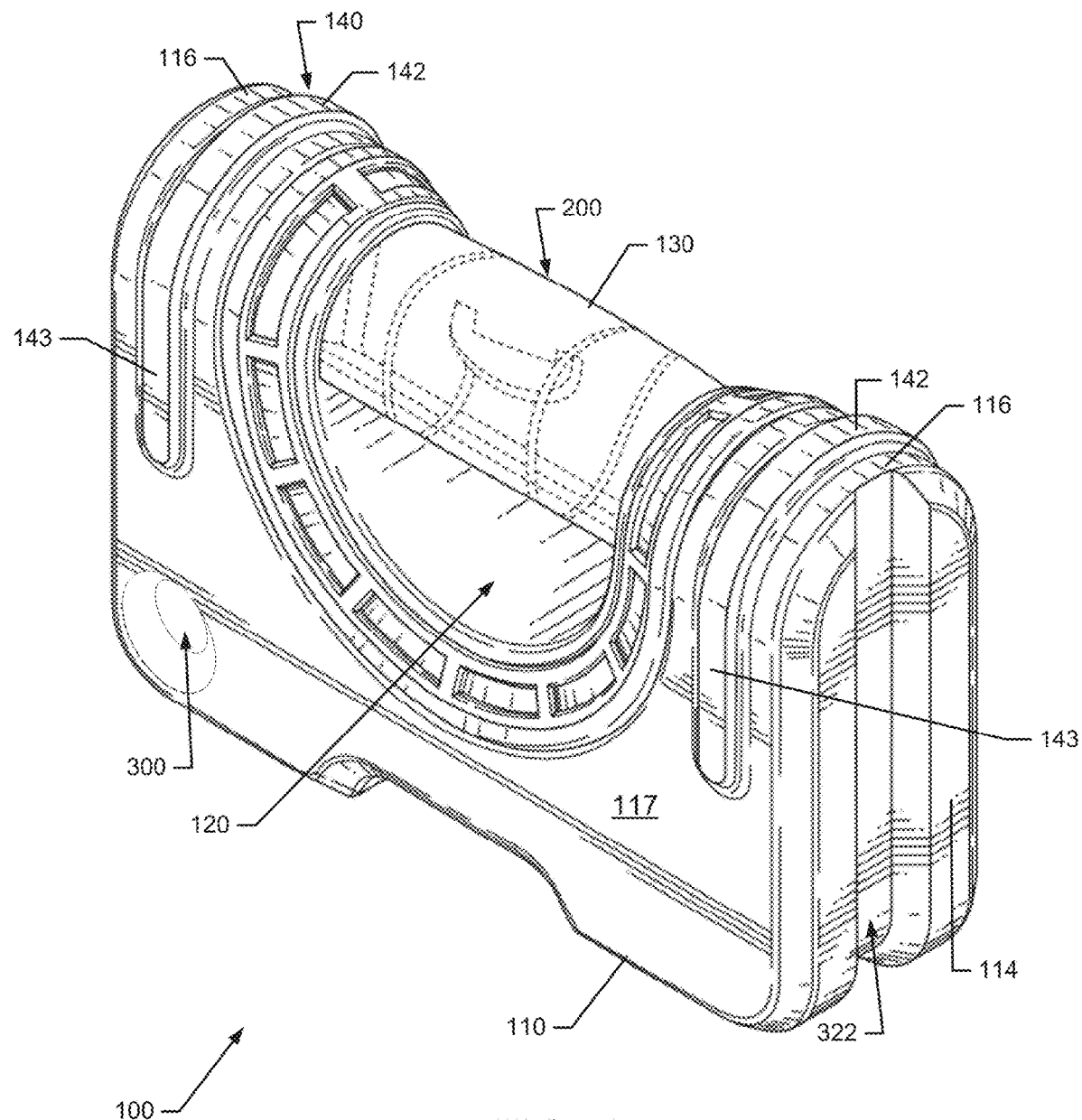
FIG. 1 is a perspective view of a leveling device in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may relate to the provision of a level (e.g., a bubble level) that may have an improved configuration by including a multidirectional vial protection assembly as described herein. In some cases, the level of example embodiments may be a pocket level, or other small leveling device that has a vial whose length is a substantial portion of the overall length of the leveling device. In this regard, for example, vial may form at least 25% of the length of the leveling device, and in some cases as much as 40% or 50% of the length of the leveling device. For small leveling devices such as this, the housing of the leveling device is very small (relative to the vial), and therefore the housing has more limited ability to protect the vial from impact damage. Meanwhile, the multidirectional vial protection assembly may define a pair of protective rib structures disposed spaced apart from the axial ends of the vial. These rib structures of the multidirectional vial protection assembly may provide protection to at least 180 degrees of otherwise exposed surfaces of the vial.

Figure 8:
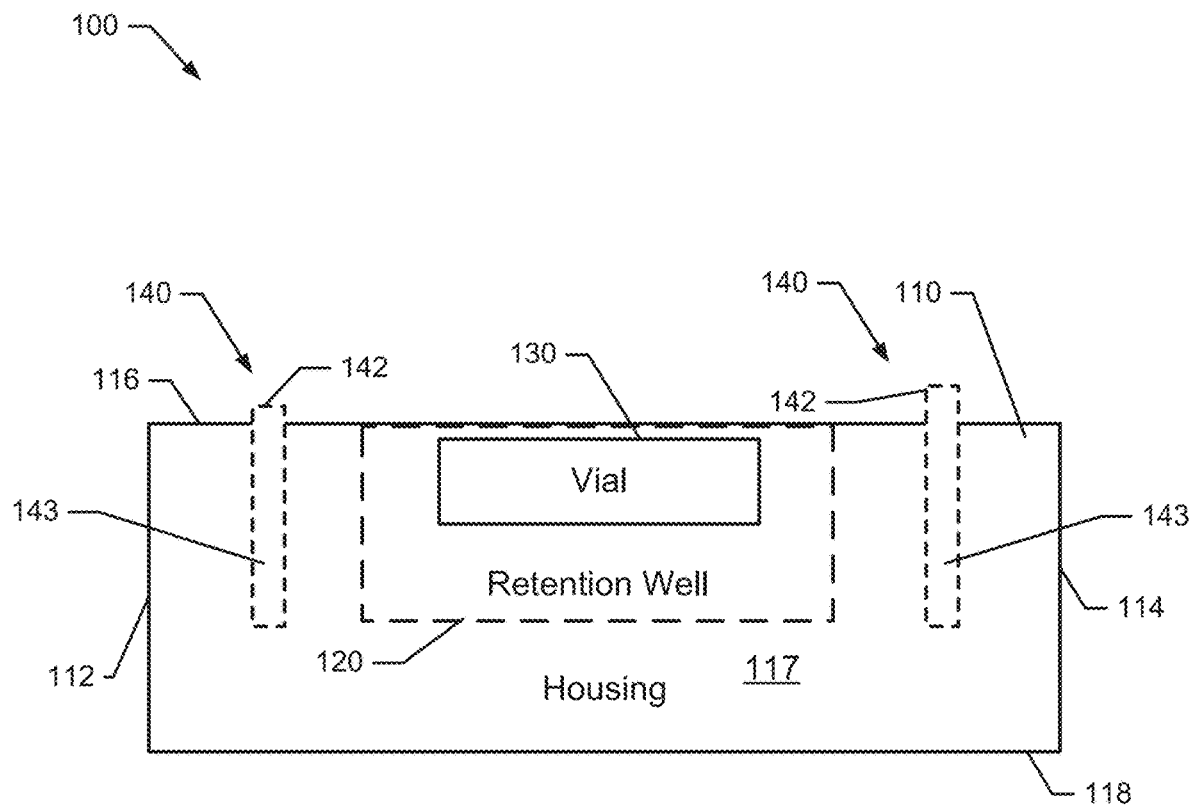
FIG. 8 is a block diagram of a leveling device of an example embodiment.

FIG. 8 illustrates a block diagram of a level (e.g., a bubble level) of an example embodiment. The level 100 includes a housing 110 that includes a flat surface that is configured to abut a surface being measured. In some cases, the housing 110 may be formed having a first end 112, a second end 114, a top face 116 and a bottom face 118. A front face 117 and a back face 119 (see FIG. 3) may extend between respective front and rear edges of the first end 112, the second end 114, the top face 116 and the bottom face 118. The bottom face 118 may include or define the flat surface mentioned above.

However, in some embodiments, the first and second ends 112 and 114, and the front and back faces 117 and 119, may each be or include substantially flat or planar surfaces that are substantially parallel to each other as well. The first end 112 and the second end 114 may also lie in planes that are parallel to each other and spaced apart from each other by the length of the top and bottom faces 116 and 118 and the front and back faces 117 and 119. The planes in which the first and second ends 112 and 114 lie may be substantially perpendicular to the planar surfaces of the bottom face 118, the front face 117 and the rear face 119. In this example, the top face 116 is not planar, and instead curves at a constant radius.

In an example embodiment, the bottom face 118 of the housing 110 may be considered to be a "base" which forms a portion of the housing 110 that is normally placed alongside the surface or component that is being measured for level or plumb. However, it should be appreciated that the first and second ends 112 and 114 may also be formed to have planar surfaces that may (although smaller) be placed alongside a surface or component being measured for level or plumb.

The housing 110 also includes a retention well 120 formed in portions of the top face 116, the front face 117 and the rear face 119. The retention well 120 receives a vial 130 inside which fluid may be provided, along with an air bubble that operates as described above. The vial 130 may generally be a cylindrical vial with a liquid therein except that the vial 130 may have a slightly elevated middle, so that the air bubble formed in the liquid will tend to sit in the middle of the vial 130 when the vial 130 is oriented such that a corresponding portion of the housing 110 is level or plumb. In an example embodiment, the vial 130 may be retained in the retention well 130 at each of the axial ends of the vial 130 by an adhesive. However, capture or friction fittings may additionally or alternatively be used to retain the vial 130 in the retention well 120. In some embodiments, the vial 130 may be a portion of a larger component (i.e., a vial assembly) that may include additional structure inside which the vial 130 may be formed. In some examples, the vial assembly by substantially fill the retention well 120. In other words, the portion of the retention well 120 that is below the vial 130 may be filled by additional structure (e.g., plastic, acrylic or other material) that forms the vial assembly. The additional material may be solid or hollow and, in some cases, may have sidewalls that extend downward from lateral sides of the vial 130 and lie parallel to the front face 117 and rear face 119, respectively. Thus, in some cases, the vial assembly may be a solid acrylic component having a hollowed cylindrical portion (i.e., the vial 130) formed at a top portion thereof.

A multidirectional vial protection assembly 140 may then be provided to protect the vial 130 within the retention well 120. In this regard, the multidirectional vial protection assembly 140 may include protective ribs 142 that are disposed on the housing 110 strategically to protrude therefrom to provide radial protection to the vial 130 spaced apart from each opposing end thereof. A specific example of some structures that may be used to implement various ones of the components described above will now be described in reference to FIGS. 1-7.

Referring to FIGS. 1-7, the top face 116 may be bisected by the retention well 120, so that the retention well 120 extends into the front and rear faces 117 and 119 from a top edge thereof. The retention well 120 of this example has a U shape, and is essentially the absence of material forming a channel inside which the vial 130 is mounted. However, it should be appreciated that the retention well 120 could alternatively have other shapes (e.g., rectangular or V shaped). The vial 130 is mounted in the retention well 120 proximate to the top face 116 and with an axis 132 of the vial 130 being substantially parallel to the flat surface of the bottom face 118. Thus, opposing axial ends of the vial 130 are retained proximate to a mouth of the retention well 120.

In this example, the retention well 120 extends into the front and rear faces 117 and 119 past the bottom radial edge vial 130 to give visibility to 360 degrees of the vial 130. Accordingly, only the axial ends of the vial 130 contact the housing 110, and remaining portions of the vial 130 are both visible and unsupported. That said, the bottom radial edge of the vial 130 faces the apex portion of the U shaped channel that defines the retention well 120. Thus, the housing 110 provides substantial protection to the bottom radial edge of the vial 130. However, all other radial edges (i.e., top and side radial edges) of the vial 130 are generally exposed to maximize visibility. This visibility, along with the small size of the level 100, makes the level 100 a very useful and popular product.

As noted above, the axial length of the vial 130 (and therefore the length of its radial edges in the axial direction) is a substantial portion of the overall length of the level 100 (or leveling device). In some embodiments, the vial 130 may have an axial length that is at least 25% of the length of the level 100 (i.e., the length of the top face 116 and bottom face 118). Moreover, in some cases, the axial length of the vial 130 may be as much as 40% or 50% (but always less than 70%) of the length of the level 100. This keeps the level 100 relatively small and easy to use and transport, while minimizing the weight of the level 100. While a level of this size is very easy to use and transport (and can even fit in a user's pocket in many instances), the small size may also lead to certain handling tendencies that could be damaging to the vial 130. For example, the level 100 may be tossed between users, or thrown in a bag or box of tools. Any such handling, not to mention inadvertently dropping the level 100, may lead to contact between the level 100 and other objects. Indeed many small sized or pocket levels on the market are routinely damaged or broken when the vial is broken by dropping or jarring contact with other objects.

Thus, the popularity and utility of the level 100 can be further enhanced by making the level 100 in such a way as to improve its durability in relation to the common handling tendencies that may otherwise shorten the life of the level 100. The multidirectional vial protection assembly 140, and more particularly the protective ribs 142, provide a relatively simple but highly effective means by which to accomplish this goal. In this regard, drop tests have shown significant increases in the survivability of the level 100 (and particularly of the vial 130) relative to other market alternatives that do not include the multidirectional vial protection assembly 140. In particular, the multidirectional vial protection assembly 140 provides protection to the vial 130 in multiple dimensions, but does so in a way that does not concentrate impact forces like many other designs (i.e., designs that do not include the structure and location of the protective ribs 142). In this regard, as will be discussed in greater detail below, the protective ribs 142 are curved with a curvature that extends smoothly over at least 180 degrees, and protrude wider than the widest point of the vial 130 on all laterally unprotected sides (i.e., on all sides other than the bottom side). The curvature (which may substantially match the curvature of the top face 116) may be selected to be a function of a radius of the vial 130, and may ensure that the impact forces on the housing 110 (and therefore also on the vial 13) are distributed the same through the housing 110 for any impacts along the top or front and back of the housing 110. Unlike a sharp corner, which may concentrate impact forces differently dependent upon how the corner strikes an object or the ground, the rounded shape of the protective ribs 142 provides an evening out of the forces.

Figure 2:
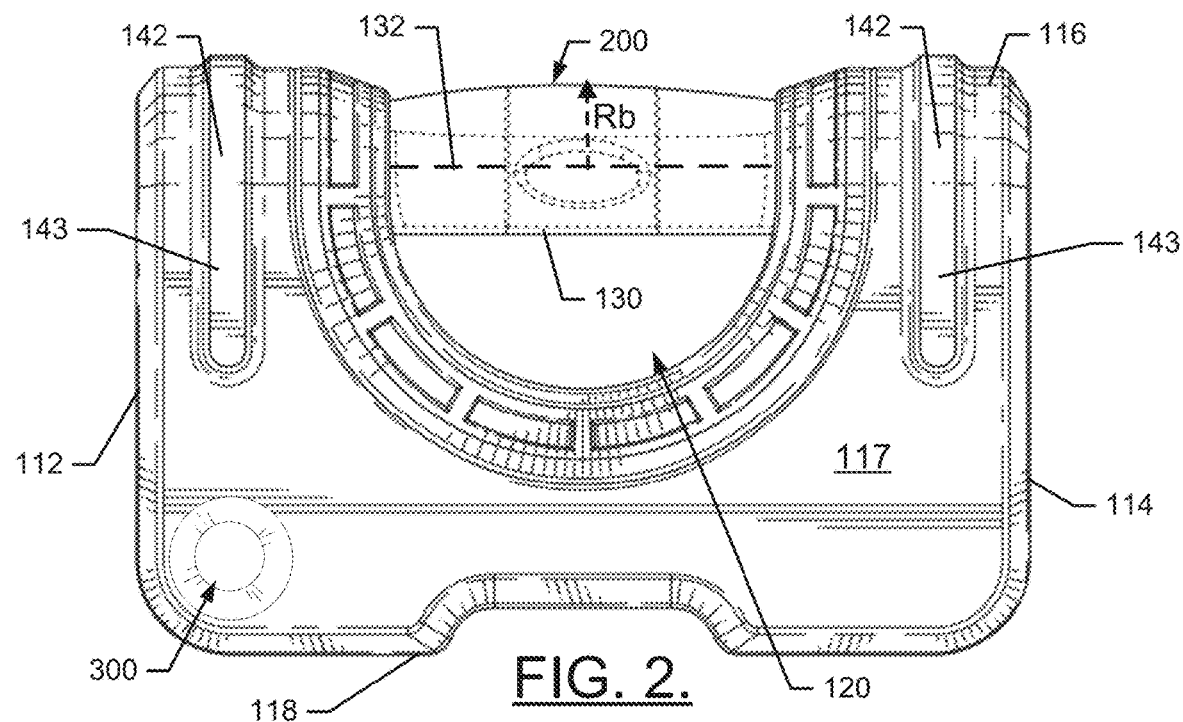
FIG. 2 is a front view of the leveling device of FIG. 1.
Figure 3:
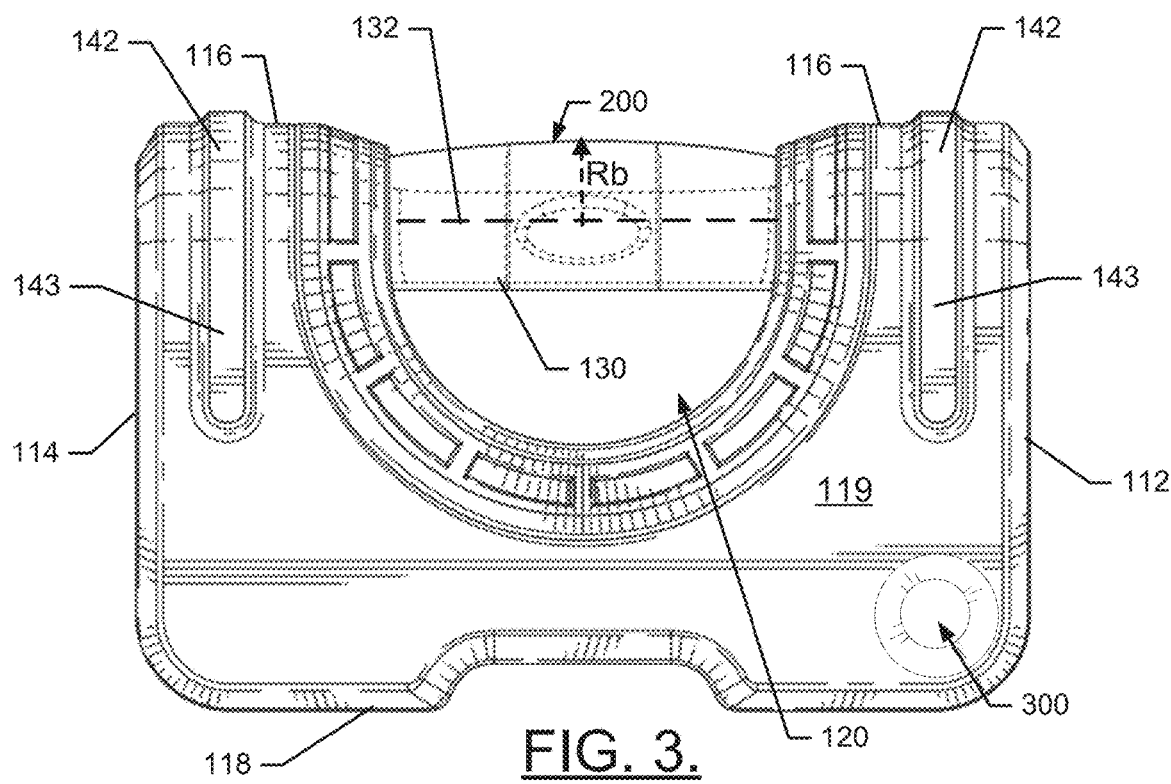
FIG. 3 is a rear view of the leveling device of FIG. 1.
Figure 4:
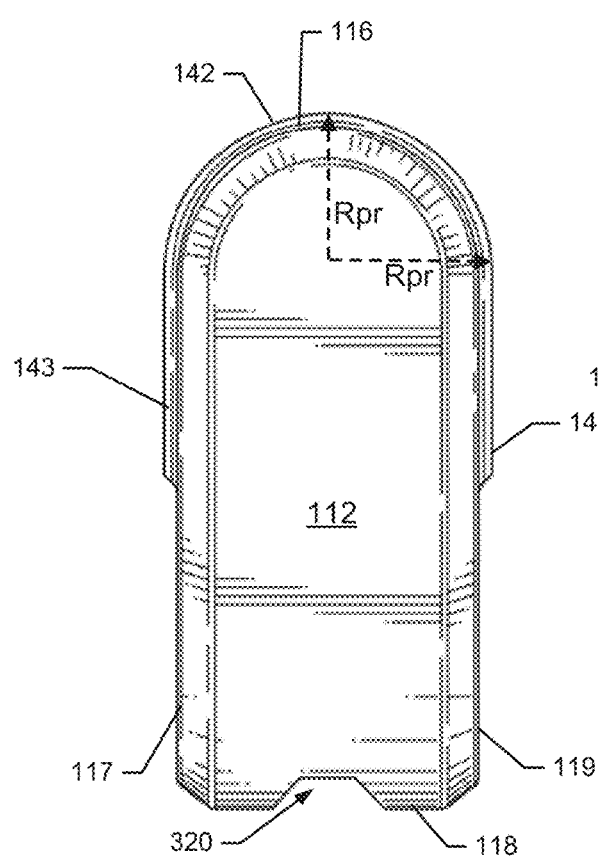
FIG. 4 is a left side view of the leveling device of FIG. 1.
Figure 5:
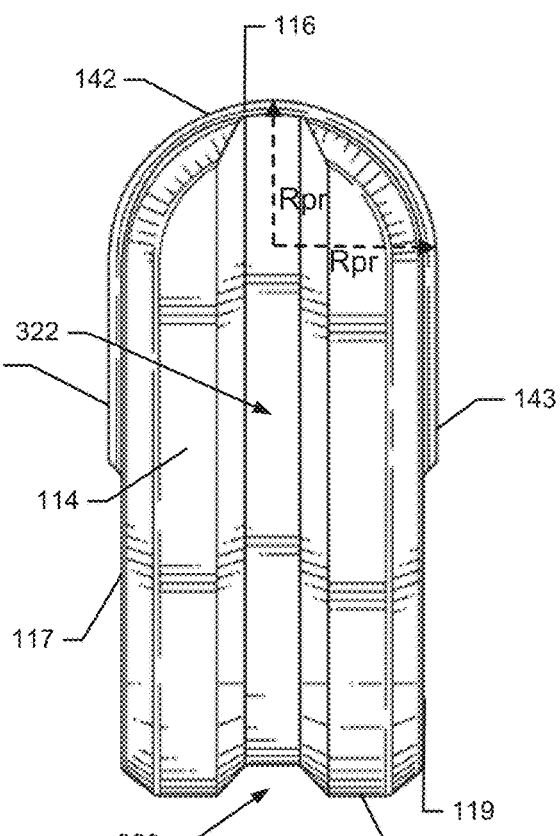
FIG. 5 is a right side view of the leveling device of FIG. 1.

The protective ribs 142 also, by virtue of being wider than any other portion of the housing 110, provide additional margin against contact with the vial 130 itself (i.e., with the unprotected lateral sides of the vial 130). In particular, since a longitudinal center of the vial 130 may be slightly wider (especially at the top portion thereof) in order to enable the air bubble to settle there when the level 100 is placed with the bottom surface 118 against a flat and level surface, the vial 130 may protrude out of the (or nearly out of the) retention well 120 in some cases. FIGS. 2 and 3 show front and rear views of a bulging portion 200 (or bulge) of the vial 130 on the top and center portion of the vial 130. A radius (R) of the vial 130 may generally be the same along lateral sides of the vial 130 that face the apex of the retention well 120 and that face in the same direction as the front face 117 and rear face 119. However, the radius (Rb) of the bulging portion 200 of the vial 130 (see FIGS. 2 and 3) may be slightly larger than the radius (R) of the vial 130 elsewhere (see FIG. 6). In some cases, the radius (Rb) of the bulging portion 200 of the vial 130 may be considered to be a maximum radius of the vial 130 and the radius (R) generally (i.e. at other locations) may be referred to as a minimum radius of the vial 130.

Accordingly, although the protective ribs 142 are curved to have a constant radius (Rpr) over 180 degrees that correspond to the top face 116 (see FIGS. 4 and 5), the radius (Rpr) of the protective ribs 142 is still larger than both the radius (Rb) of the bulging portion 200 of the vial 130 and the radius (R) of the vial 130 elsewhere. In other words, the radius of the circular portion of the protective ribs 142 is larger than both the minimum radius and the maximum radius of the vial 130. The protective ribs 142 therefore protrude from the housing 110 (e.g., by a distance of about 1 mm to about 3 mm) to protect and provide margin against impact with surfaces or objects that approach the vial 130 toward its unprotected lateral sides. Each of the radiuses (i.e., R, Rb and Rpr) may be measured from the axis 132 of the vial 130.

Figure 6:
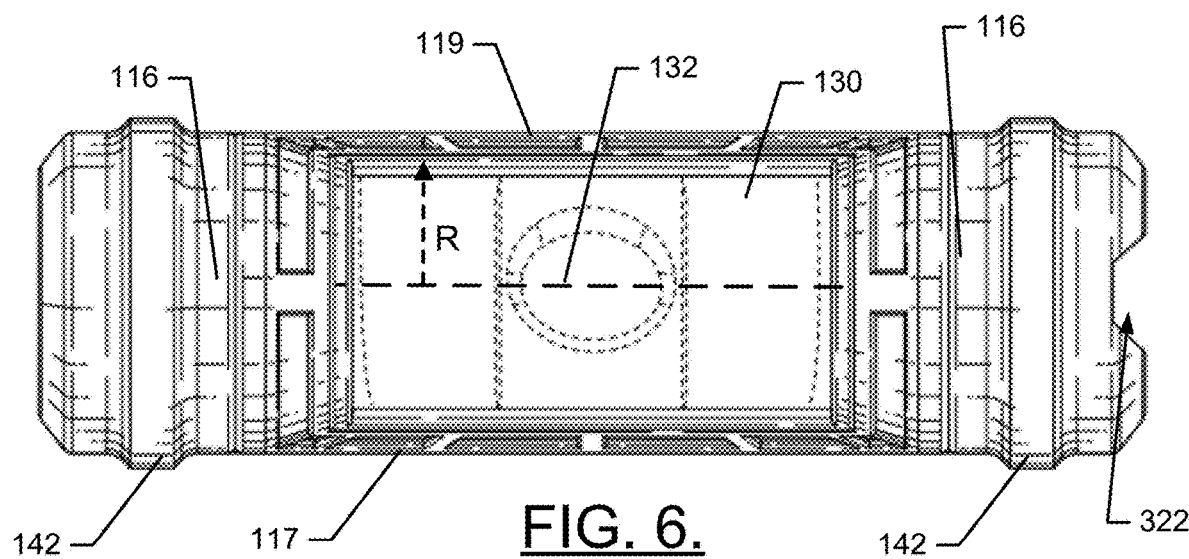
FIG. 6 is a top view of the leveling device of FIG. 1.
Figure 7:
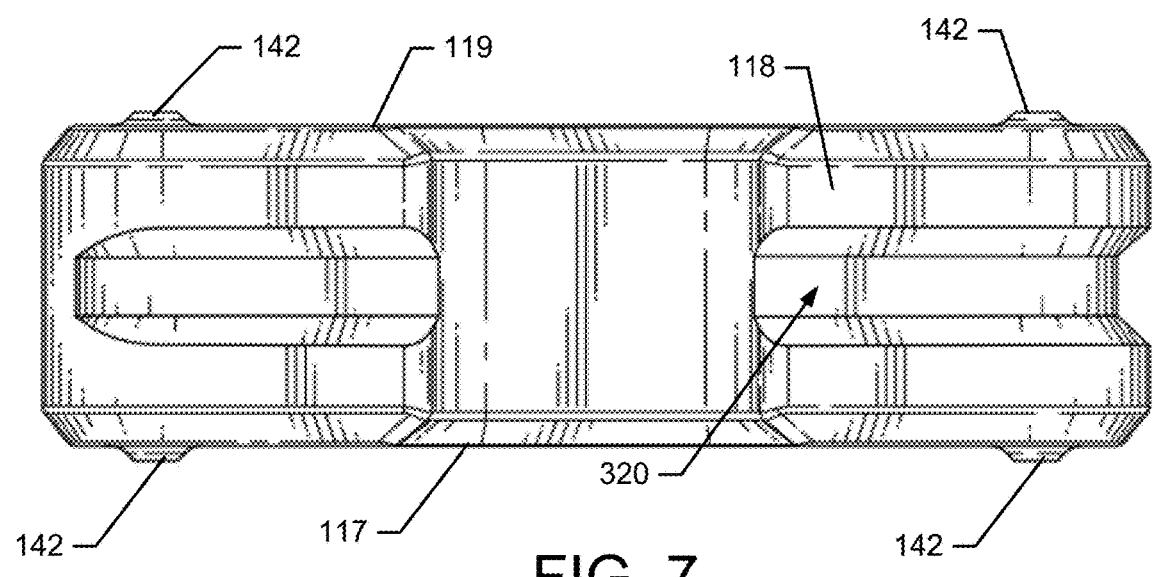
FIG. 7 is a bottom view of the leveling device of FIG. 1 according to an example embodiment.

As can be seen in FIGS. 6 and 7, the protective ribs 142 define the widest width of the level 100 in the depth direction measured from the front face 117 to the rear face 119 direction. Moreover, the protective ribs 142 also define the highest extension of the level 100 in the height direction, and are located proximate to each axial end of the vial 130. Accordingly, the protective ribs provide protection for the vial 130 over more than 180 degrees measured radially around the axis 132 of the vial 130 thereby rendering the vial 130 protected over multiple directions via a single structure.

In addition to extending around the top face 116 (and thereby defining a half circle shape with the radius (Rpr)), the protective ribs 142 also extend tangential to the respective ends of the half circle shaped portion of the protective ribs 142 down the front face 117 and rear face 119, respectively, to extend at least as far down the front and rear faces 117 and 119 as the retention well 120 extends into the front and rear faces 117 and 119. The extension of the protective ribs 142 along the front and rear faces 117 and 119 to at least the depth of the retention well 120 ensures that impact with any object or surface over any part of the level 100 that is proximate to the lateral sides of the vial 130 or the retention well 120 will have a greater chance of first contacting one or both of the protective ribs 142. The extended length of the protective ribs 142 also ensures that the level 100 could be used with the front face 117 or rear face 119 placed proximate to the surface that is being measured for level. In this regard, the extended lengths of the protective ribs 142 provide a flat surface that can be placed on the surface that is being measured. The extension of the protective ribs 142 may therefore extend over at least 40% of the length of the front and rear faces 117 and 119 in a direction perpendicular to the axis 132 of the vial 130. Moreover, in some cases, the protective ribs 142 extend over at least 50% of the length of the front and rear faces 117 and 119. In either case, the protective ribs 142 are necessary to make the front and rear faces 117 and 119 useful for serving as references from which level can be measured for an adjacent surface, if such capability is desired.

Meanwhile, as shown in FIGS. 2 and 3, the width of the protective ribs 142 is less than both a distance between the first end 112 (or second end 114) and its closest protective rib 142, and a distance between the retention well 120 and the closest protective rib 142 to either opposing side thereof. In some cases, the width of the protective ribs 142 may be between about 1 mm and about 6 mm.

Although not required, some embodiments may include a through passage 300 that passes entirely through the level 100 from the front face 117 to the rear face 119. The through passage 300 may be used to secure a lanyard to the level 100 to enable the user to reduce the likelihood of the level 100 being dropped and damaged. The through passage 300 of this example is aligned with one of the protective ribs 142. However, other positioning on the front and rear faces 117 and 119 is also possible.

In some embodiments, although the bottom face 118 may be configured to lie on or against a flat surface, a groove 320 may also be provided in the flat surface in order to enable the level 100 to be used in other contexts. For example, the groove 320 may be useful for employment of the level 100 on a pipe or other rounded object. One or both of the first end 112 and second end 114 may also include a groove 322 therein for similar purposes with respect to measuring plumb for a pipe or other rounded object that extends vertically.

In some embodiments, the housing 110 (or at least significant portions thereof) may be molded or cast from a single material. For example, the housing 110 may be made of aluminum or a composite/plastic material. Combinations of such materials for various portions of the level 100 are also possible. Even in situations where the housing 110 is made from a single material, the protective ribs 142 may both shield the vial 130 and more evenly distribute any impact forces regardless of the angle of impact, while still allowing maximum unencumbered visibility of the vial 130.

In an example embodiment, a level (e.g., a bubble level) device may be provided. The level device may include a housing, a vial, a retention well and a multidirectional vial protection assembly. The housing may have a top face, a bottom face, a front face, a rear face, a first end and a second end. The vial may include a generally cylindrical tube with a bulge formed at a middle portion thereof. The vial may contain a liquid therein and an air bubble formed in the liquid such that the air bubble sits in the bulge when the vial is oriented such that one of the bottom face, front face, rear face, first end or second end is level or plumb. The retention well may be formed in the top face and extend through portions of the front and the rear faces toward the bottom face. The vial may be retained at opposing axial ends thereof in the retention well and may include an axis that extends substantially perpendicular to respective planes of the first end and the second end. The multidirectional vial protection assembly may be configured to extend over the top face proximate to the opposing axial ends of the vial to protect the vial in at least three directions.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the multidirectional vial protection assembly may include a first protective rib disposed proximate to a first of the opposing axial ends of the vial, and a second protective rib disposed proximate to a second of the opposing axial ends of the vial. In an example embodiment, the first and second protective ribs may each include a circular portion extending over the top face. The circular portion may have a radius larger than both a minimum radius of the vial and a maximum radius of the vial. The maximum radius of the vial may be measured at the bulge relative to the axis. In some cases, the first and second protective ribs may each include extension portions 143 that extend tangentially away from opposing ends of the circular portion along the front face and the rear face. In an example embodiment, the extension portions 143 may extend at least as far along the front face and the rear face as the retention well. In some cases, the extension portions 143 may extend to be greater than 40% (or even greater than 50%) as long as a length of the front face and the rear face measured from the top face toward the bottom face. In an example embodiment, the first and second protective ribs may be disposed farther from the first of the opposing axial ends of the vial than from the first end and the second end of the housing. In some cases, the first and second protective ribs may have a width of between about 1 mm and about 6 mm. In an example embodiment, the first and second protective ribs may extend away from the top face, the front face and the rear face by a distance of between about 1 mm and about 3 mm. In some cases, the retention well may bisect the top face and may be disposed between the first and second protective ribs. In an example embodiment, the retention well may form a U shaped channel extending from the top face toward the bottom face. In some cases, the vial may be exposed on three lateral sides thereof, and may face the U shaped channel on a fourth lateral side thereof. In an example embodiment, the housing may further include a through passage extending from the front face to the rear face. In some cases, the through channel may be aligned with one of the first protective rib or the second protective rib. In an example embodiment, the first end or the second end may include a groove extending along the first end or the second end from the top face to the bottom face. In some cases, the bottom face may include a groove extending from the first end to the second end. In an example embodiment, the housing may be cast aluminum. In an example embodiment, an adhesive may retain the opposing axial ends of the vial in the retention well. In some cases, the vial may have a length that is between about 25% and 70% of a length of the bottom face.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A level device comprising:
    a housing having a top face, a bottom face, a front face, a rear face, a first end and a second end;
    a vial comprising a generally cylindrical tube with a bulge formed at a middle portion thereof, the vial containing a liquid therein and an air bubble formed in the liquid such that the air bubble sits in the bulge when the vial is oriented such that one of the bottom face, front face, rear face, first end or second end is level or plumb;
    a retention well formed in the top face and extending through portions of the front and the rear faces toward the bottom face, the vial being retained at opposing axial ends thereof in the retention well defining an axis that extends substantially perpendicular to respective planes of the first end and the second end; and
    a multidirectional vial protection assembly configured to extend over the top face proximate to the opposing axial ends of the vial to protect the vial in at least three directions,
    wherein the retention well bisects the top face and forms a U shaped channel extending from the top face toward the bottom face, and
    wherein the vial is exposed on three lateral sides thereof, and on a fourth lateral side the vial faces and is spaced apart from a curved surface of the U shaped channel.

2. The device of claim 1, wherein the first end or the second end comprises a groove extending along the first end or the second end from the top face to the bottom face.

3. The device of claim 1, wherein the bottom face comprises a groove extending from the first end to the second end.

4. The device of claim 1, wherein the vial has a length that is between about 25% and 70% of a length of the bottom face.

5. The device of claim 1, wherein the housing is cast aluminum.

6. The device of claim 5, wherein an adhesive retains the opposing axial ends of the vial in the retention well.

7. The device of claim 1, wherein the multidirectional vial protection assembly comprises a first protective rib disposed proximate to a first of the opposing axial ends of the vial, and a second protective rib disposed proximate to a second of the opposing axial ends of the vial.

8. The device of claim 7, wherein the first and second protective ribs are disposed farther from the first of the opposing axial ends of the vial than from the first end and the second end of the housing.

9. The device of claim 7, wherein the first and second protective ribs have a width of between 1 mm and 6 mm.

10. The device of claim 7, wherein the first and second protective ribs extend away from the top face, the front face and the rear face by a distance of between 1 mm and 3 mm.

11. The device of claim 7, wherein the retention well is disposed between the first and second protective ribs.

12. The device of claim 7, wherein the housing further comprises a through passage extending from the front face to the rear face.

13. The device of claim 12, wherein the through passage is aligned with one of the first protective rib or the second protective rib.

14. The device of claim 7, wherein the first and second protective ribs each include a circular portion extending over the top face, the circular portion having a radius larger than both a minimum radius of the vial and a maximum radius of the vial, the maximum radius of the vial being measured at the bulge relative to the axis.

15. The device of claim 14, wherein the first and second protective ribs each include extension portions that extend tangentially away from opposing ends of the circular portion along the front face and the rear face.

16. The device of claim 15, wherein the extension portions extend at least as far along the front face and the rear face as the retention well.

17. The device of claim 15, wherein the extension portions extend to be greater than 40% as long as a length of the front face and the rear face measured from the top face toward the bottom face.

18. The device of claim 15, wherein the extension portions extend to be greater than 50% as long as a length of the front face and the rear face measured from the top face toward the bottom face.

19. A level device comprising:
a housing having a top face, a bottom face, a front face, a rear face, a first end and a second end;
a vial comprising a generally cylindrical tube with a bulge formed at a middle portion thereof, the vial containing a liquid therein and an air bubble formed in the liquid such that the air bubble sits in the bulge when the vial is oriented such that one of the bottom face, front face, rear face, first end or second end is level or plumb;
a retention well formed in the top face and extending through portions of the front and the rear faces toward the bottom face, the vial being retained at opposing axial ends thereof in the retention well defining an axis that extends substantially perpendicular to respective planes of the first end and the second end; and
a multidirectional vial protection assembly configured to extend over the top face proximate to the opposing axial ends of the vial to protect the vial in at least three directions,
wherein the multidirectional vial protection assembly comprises a first protective rib disposed proximate to a first of the opposing axial ends of the vial, and a second protective rib disposed proximate to a second of the opposing axial ends of the vial,
wherein the first and second protective ribs are adjoined by the top face on either side of each of the first and second protective ribs between the retention well and the first and second ends of the housing, and
wherein the first and second protective ribs are raised relative to the top face.

20. A level device comprising:
a housing having a top face, a bottom face, a front face, a rear face, a first end and a second end;
a vial comprising a generally cylindrical tube with a bulge formed at a middle portion thereof, the vial containing a liquid therein and an air bubble formed in the liquid such that the air bubble sits in the bulge when the vial is oriented such that one of the bottom face, front face, rear face, first end or second end is level or plumb;
a U shaped retention well formed in the top face and extending through portions of the front and the rear faces toward the bottom face, the vial being retained at opposing axial ends thereof in the retention well defining an axis that extends substantially perpendicular to respective planes of the first end and the second end; and
a multidirectional vial protection assembly configured to extend over the top face proximate to the opposing axial ends of the vial to protect the vial in at least three directions,
wherein the multidirectional vial protection assembly comprises a first protective rib disposed proximate to a first of the opposing axial ends of the vial, and a second protective rib disposed proximate to a second of the opposing axial ends of the vial,
wherein the first and second protective ribs each include extension portions that extend in a direction away from the top face and along the front and rear faces of the housing, and
wherein the extension portions extend at least as far along the front face and the rear face as a bottom-most point of the U shaped retention well.

* * * * *

UNITED STATES PATENT AND TRADEMARK OFFICE
CERTIFICATE OF CORRECTION

PATENT NO. : 11,898,877 B2
APPLICATION NO. : 17/228012
DATED : February 13, 2024
INVENTOR(S) : Adam Baxter et al.

It is certified that error appears in the above-identified patent and that said Letters Patent is hereby corrected as shown below:

In the Claims

In Column 8, Claim 4, Line 59, "between about 25%" should read --between 25%--

Signed and Sealed this
Sixteenth Day of April, 2024

Katherine Kelly Vidal
*Director of the United States Patent and Trademark Office*